United States Patent
Kameyama et al.

[11] Patent Number: 5,999,243
[45] Date of Patent: Dec. 7, 1999

[54] LIQUID CRYSTAL ELEMENT COMPRISING ORIENTED LIQUID CRYSTAL POLYMER WITH AN AVERAGE IN-PLANE HAZE OF 10% OR HIGHER

[75] Inventors: Tadayuki Kameyama; Hisashi Mihara; Hironori Motomura; Naoki Takahashi, all of Osaka, Japan

[73] Assignee: Nitto Denko Corporation, Osaka, Japan

[21] Appl. No.: 09/181,664

[22] Filed: Oct. 29, 1998

[30] Foreign Application Priority Data

Oct. 29, 1997 [JP] Japan .................................. 9-314500

[51] Int. Cl.$^6$ .......................... C09K 19/02; G02F 1/1335
[52] U.S. Cl. ............................. 349/185; 349/98; 349/175
[58] Field of Search ............................. 349/98, 175, 185, 349/123

[56] References Cited

U.S. PATENT DOCUMENTS

| | | | |
|---|---|---|---|
| 5,368,770 | 11/1994 | Saupe et al. | 252/299.01 |
| 5,386,306 | 1/1995 | Gunjima et al. | 359/52 |
| 5,506,704 | 4/1996 | Broer et al. | 359/63 |
| 5,627,666 | 5/1997 | Sharp et al. | 349/74 |
| 5,695,682 | 12/1997 | Doane et al. | 252/299.01 |
| 5,796,454 | 8/1998 | Ma | 349/98 |
| 5,825,444 | 10/1998 | Broer et al. | 349/98 |
| 5,847,798 | 12/1998 | Yang et al. | 349/169 |
| 5,858,268 | 1/1999 | Niiyama et al. | 252/299.01 |
| 5,875,012 | 2/1999 | Crawford et al. | 349/74 |

*Primary Examiner*—William L. Sikes
*Assistant Examiner*—Tarifur R. Chowdhury
*Attorney, Agent, or Firm*—Sughrue, Mion, Zinn, Macpeak & Seas, PLLC

[57] ABSTRACT

A liquid crystal element which comprises an oriented liquid crystal polymer and with which a liquid crystal display less apt to have display unevenness in a wide viewing range including the front and slant directions can be fabricated; and an optical element and a polarizing element each containing the liquid crystal element. The liquid crystal element comprises either a layer of an oriented liquid crystal polymer or a substrate and formed thereon the layer of an oriented liquid crystal polymer, wherein the liquid crystal polymer layer has an average in-plane haze of 10% or higher and a dispersion of the in-plane haze H (%) within the range represented by the relationship $a-\sqrt{(10a)} \leq H \leq a+\sqrt{(10a)}$ wherein "a" is the average haze (%), or has an average in-plane haze lower than 10% and a dispersion of the in-plane haze H (%) within the range represented by the relationship $0 \leq H \leq b+\sqrt{(10b)}$ wherein "b" is the average haze (%). The optical element comprises a multilayer structure comprising the liquid crystal element and a retardation film laminated thereon. The polarizing element comprises a multilayer structure comprising the liquid crystal or optical element and a polarizing plate laminated thereon.

11 Claims, 2 Drawing Sheets

LIQUID CRYSTAL ELEMENT COMPRISING ORIENTED LIQUID CRYSTAL POLYMER WITH AN AVERAGE IN-PLANE HAZE OF 10% OR HIGHER

FIELD OF THE INVENTION

The present invention relates to a liquid crystal element which has excellent orientation property of a liquid crystal polymer and evenness of the orientation and is suitable for use in, for example, improving brightness and visual perceptibility of liquid crystal displays. The present invention further relates to an optical element and a polarizing element.

BACKGROUND OF THE INVENTION

Liquid crystal elements comprising an oriented layer of a liquid crystal polymer or comprising a substrate and the oriented layer formed thereon are utilized in various optoelectronics fields. Examples thereof include a retardation plate for compensating for a retardation of a liquid crystal cell to thereby inhibit coloration or the like and a circularly polarized light separation layer which uses a cholesteric liquid crystal as a liquid crystal polymer. The circularly polarized light separation layer separates natural light into left- and right-circularly polarized lights and converts the same into linearly polarized light through a ¼ wavelength plate to thereby diminish absorption loss due to a polarizing plate. This separation layer is hence expected to bring about, for example, an improvement in the brightness of a liquid crystal display.

In practically using the oriented layer of a liquid crystal polymer, retardation characteristics in a three-dimensional direction including in-plane and thickness direction is related in a retardation film for compensation, and reflection characteristics including circular dichroism (wavelength region for selective reflection) is related in a circularly polarized light separation layer. Therefore, the oriented layer has conventionally been controlled so as to have optical characteristics according to the purpose of use. However, even where retardation characteristics, reflection characteristics, etc. have been matched and hence there has been no problem in visual perception in the front (perpendicular) direction, there has been the problem such that display unevenness such as coloration has developed in visual perception from slant direction.

SUMMARY OF THE INVENTION

Accordingly one object of the present invention is to provide a liquid crystal element comprising an oriented material of a liquid crystal polymer, which can form a liquid crystal display which is difficult to develop display unevenness in a wide viewing range including front and slant directions.

Another object of the present invention is to provide an optical element using the liquid crystal element.

Still another object of the present invention is to provide a polarizing element using the liquid crystal element.

According to a first embodiment of the present invention, there is provided a liquid crystal element comprising an oriented layer of a liquid crystal polymer, or a substrate having formed thereon the oriented layer of a liquid crystal polymer, wherein the oriented layer of a liquid crystal polymer layer has an average in-plane haze of 10% or higher and has a dispersion of the in-plane haze H (%) within the range represented by the formula: $a-\sqrt{(10a)} \leq H \leq a+\sqrt{(10a)}$ wherein "a" is the average haze (%).

According to a second embodiment of the present invention, there is provided a liquid crystal element comprising an oriented layer of a liquid crystal polymer, or a substrate having formed thereon the oriented layer of a liquid crystal polymer, wherein the oriented layer of a liquid crystal polymer has an average in-plane haze of lower than 10% and has a dispersion of the in-plane haze H (%) within the range represented by the formula: $0 \leq H \leq b+\sqrt{(10b)}$ wherein "b" is the average haze (%).

According a third embodiment of the present invention, there is provided an optical element comprising a laminated structure of the liquid crystal element and a retardation film.

According a fourth embodiment of the present invention, there is provided a polarizing element comprising a laminated structure of the liquid crystal or optical element, and a polarizing plate.

According to the present invention, a liquid crystal display which is difficult to develop display unevenness in a wide viewing range including the front and slant directions can stably be obtained. This is due to the use of a liquid crystal element having the haze characteristics described above.

The present inventors have made intensive studies to overcome the problem that display unevenness is developed in visual perception from a slant direction where retardation characteristics, reflection characteristics, etc., are matched and therefore there is no problem in visual perception from the front direction. As a result, it has been found that the generation of display unevenness in viewing from slant direction is due to an uneven orientation of liquid crystal polymer, i.e., scattering due to dispersion of orientation direction, and orientation state of a liquid crystal polymer can be controlled by adjusting a haze.

It has also been found that the orientation state and haze required for the liquid crystal polymer oriented layer varies depending on every purpose of use such as a retardation film or a circularly polarized light separation layer. For example, where it is required for display light to be emitted in many directions as in, e.g., liquid crystal monitors of large displays, the liquid crystal polymer oriented layer may have an average in-plane haze of 10% or higher and may have a dispersion of the in-plane haze H (%) within the range represented by $a-\sqrt{(10a)} \leq H \leq a+\sqrt{(10a)}$ wherein "a" is the average haze (%).

On the other hand, in use where front-direction brightness is important as in, e.g., liquid crystal monitors of notebook type personal computers, the average in-plane haze is desirably lower than 10%. In retardation films for use in compensating for a retardation in liquid-crystal cells to inhibit coloration, etc., the average haze is desirably 1% or lower. In these uses, the liquid crystal polymer oriented layer may have a dispersion of the in-plane haze H (%) within the range represented by $0 \leq H \leq b+\sqrt{(10b)}$ wherein "b" is the average haze (%).

As described above, a liquid crystal element having small orientation unevenness and excellent orientation characteristics is obtained by controlling the average in-plane haze and dsispersion of the haze. Using this liquid crystal element, a liquid crystal display can stably be obtained which has a small display unevenness in the front and slant directions, a wide viewing angle, and excellent brightness and visual perceptibility. Further, due to the method for haze control, simple and efficient selection is possible and the objective liquid crystal element can efficiently be obtained.

1, 11, 12: Oriented layer of liquid crystal polymer (retardation film for compensation, circularly polarized light separation layer, etc.)

2: Substrate

21: Oriented film

3: Retardation film (¼ wavelength plate)

4: Polarizing plate

5: Surface light source (light guide plate)

51: Reflecting layer

52: Light source

7: Liquid crystal cell (liquid crystal display)

71: Polarizing plate

DETAILED DESCRIPTION OF THE INVENTION

Figure 1:
FIG. 1 is a sectional view showing one example of the liquid crystal element.
Figure 2:
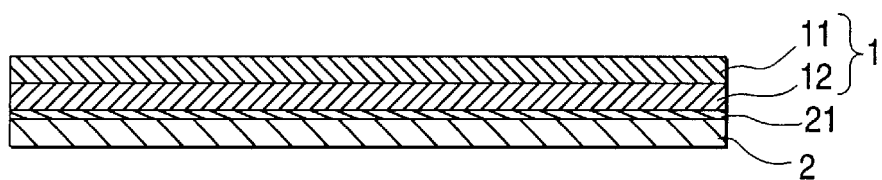
FIG. 2 is a sectional view showing another example of the liquid crystal element.

The liquid crystal element of the present invention comprises an oriented layer of a liquid crystal polymer, or a substrate having formed thereon the oriented layer of a liquid crystal polymer, wherein the liquid crystal polymer layer has an average in-plane haze of 10% or higher and a dsipersion of the in-plane haze H (%) within the range represented by the formula $a-\sqrt{(10a)} \leq H \leq a+\sqrt{(10a)}$ wherein "a" is the average haze (%), or-has an average in-plane haze lower than 10% and a dispersion of the in-plane haze H (%) within the range represented by the formula $0 \leq H \leq b+\sqrt{(10b)}$ wherein "b" is the average haze (%). Examples of the liquid crystal element are shown in FIGS. 1 and 2, wherein 1 is an oriented layer of a liquid crystal polymer, 2 is a substrate, and 21 is an oriented film.

The liquid crystal element can be produced by, for example, a method comprising spreading a liquid crystal polymer on an oriented film, heating the spread polymer at a temperature which is not lower than the glass transition temperature but is lower than the isotropic phase transition temperature thereof at which the polymer shows a liquid crystal phase, and then cooling the polymer to a temperature lower than the glass transition temperature thereof while maintaining the liquid crystal polymer in an oriented state to thereby make the liquid crystal polymer into a glassy state, and then forming a solidified layer-in which the orientation has been fixed.

The oriented film used is oriented films used for low molecular liquid crystals, such as a film obtained by rubbing a polymer layer with a rayon cloth or the like, a film formed by an oblique evaporation of $SiO_2$, etc., or an oriented film substrate comprising a stretched film or a UV curable LCP. Examples of the polymers for forming the above rubbed film, stretched film, and the like include olefin polymers such as polyethylene, polypropylene, polyolefins having a norbornene structure, and ethylene/propylene copolymers; polyester polymers such as poly(ethylene terephthalate) and poly(ethylene naphthalate); cellulosic polymers such as cellulose diacetate and cellulose triacetate; acrylic polymers such as poly(methyl methacrylate); amide polymers such as nylons and aromatic polyamides; imide polymers, sulfone polymers, polyethersulfone polymers, polyetheretherketone polymers, poly(phenylene sulfide) polymers, vinyl alcohol polymers, vinyl chloride polymers, vinylidene chloride polymers, vinyl butyral polymers, carbonate polymers, arylate polymers, polyoxymethylene polymers, and styrene polymers.

The oriented film can be formed by, for example, a method comprising applying a polymer solution on a substrate and rubbing the resulting polymer layer or a method comprising orientation-evaporating an oriented film-forming material on a substrate. The oriented film thus formed has a thin film of a single- or multilayer structure having a thickness of, for example, generally 5 μm or smaller, preferably 0.001 to 1 μm, and more preferably 0.01 to 0.5 μm. The rubbed film may be formed by other methods. For example, the rubbed film can be formed by coextruding a polymer for forming an oriented film and a polymer for forming a substrate to form a laminate film having two or more layers and then rubbing the laminate film.

The substrate which can be used is an appropriate single- or multilayered, transparent substrate such as a substrate made of, for example, of the above-described polymers for forming an oriented film. In particular, substrates having excellent isotropy and considerably decreased birefringence, such as cellulose triacetate films or glass plates, are preferably used in the point of orientation property of a liquid crystal polymer. Thickness of the substrate is appropriately determined. The thickness thereof is generally 500 μm or smaller, preferably 5 to 200 μm, and more preferably 10 to 100 μm, from the standpoints of light transmittance, strength, etc.

On the other hand, the oriented film comprising the above-described oriented film substrate can be obtained by, for example, a method of forming a single- or multilayered film by an appropriate method such as a casting method, an extrusion method or a coextrusion method of two or more layers, and then stretching the film by an appropriate manner such as uniaxial stretching or biaxial stretching. A uniaxially stretched film is preferred from the standpoints of uniformity of molecular orientation, etc. The oriented film substrate may be an unstretched film which has undergone molecular orientation by crystallization. The thickness of the oriented film substrate may be the same-as that of the substrate described above.

A preferred oriented film has excellent uniformity of orientation. Dispersion of orientation in the oriented film may decrease the orientation property of a liquid crystal polymer or may cause dispersion in the orientation direction. Scatter in the orientation direction of a liquid crystal polymer, i.e., orientation unevenness, may result in brightness unevenness, color unevenness, etc., when the liquid crystal element is applied to liquid crystal displays or the like.

Spreading a liquid crystal polymer on the oriented film may be conducted by a heat melting method, or the liquid crystal polymer may be spread as a solution in a solvent. An appropriate solvent may be used, such as methylene chloride, cyclohexanone, trichloroethylene, tetrachloroethane, N-methylpyrrolidone or tetrahydrofuran.

The spreading can be conducted by an appropriate method such as, e.g., spin coating, roll coating, flow coating, printing, dip coating, casting, bar coating, or gravure printing. If desired and necessary, the spreading may be conducted in such a manner that liquid crystal polymer layers are superposed on each other through an oriented film. Further, if required and necessary, various additives such as stabilizers, plasticizers, and metals may be incorporated into the liquid crystal polymer to be spread.

The treatment for orienting the spread layer of the liquid crystal polymer can be conducted by, as described above, heating the spread layer at a temperature which is not lower than the glass transition temperature but is below the isotropic phase transition temperature thereof and at which temperature the polymer shows a liquid crystal phase, and cooling the polymer to a temperature lower than the glass transition temperature thereof in the state that the liquid crystal polymer is oriented, to thereby bring the liquid crystal polymer into a glassy state, and fixing the oriented state. The cooling can be conducted by an appropriate method, e.g., forced cooling or natural cooling.

In the present invention, the oriented state of the liquid crystal polymer can easily be judged by measuring a haze during the production. Thus, the objective liquid crystal elements can efficiently be selected. This technique is applicable to the continuous production of liquid crystal elements. Criteria for this selection are as follows. Where the average in-plane haze is 10% or higher, the dispersion of the in-plane haze H (%) is within the range represented by the relationship $a-\sqrt{(10a)} \leq H \leq a+\sqrt{(10a)}$ wherein "a" is the average haze (%). On the other hand, where the average in-plane haze is lower than 10%, the dispersion of the in-plane haze H (%) is within the range represented by the relationship $0 \leq H \leq b+\sqrt{(10b)}$ wherein "b" is the average haze (%).

From the standpoints of display unevenness inhibition, etc., the preferred criteria for selection where the average in-plane haze is 10% or higher are that the dispersion of the haze H (%) is within the range represented by the relationship $a-\sqrt{(8a)} \leq H \leq a+\sqrt{(8a)}$, preferably $a-2\sqrt{a} \leq H \leq a+2\sqrt{a}$, and more preferably $a-\sqrt{a} \leq H \leq a+\sqrt{a}$.

On the other hand, where the average in-plane haze is lower than 10%, the preferred criteria for selection from the standpoints of display unevenness inhibition, etc. are that the dispersion of the haze H (%) is within the range represented by the relationship $0 \leq H \leq b+\sqrt{(8b)}$, preferably $0 \leq H \leq b+2\sqrt{b}$, and more preferably $0 \leq H \leq b+\sqrt{b}$. The average haze b is preferably 7% or lower, more preferably 3% or lower, and most preferably 1% or lower. When the average haze b is 1% or lower, the dispersion of the haze H (%) is especially preferably within the range represented by the relationship $0 \leq H \leq b+2\sqrt{b}$.

The liquid crystal polymer used for forming a liquid crystal element is not particularly limited, and a suitable one can be used according to the intended liquid crystal element, e.g., a polarizing layer, layer for optical rotation, retardation layer, or circularly polarized light separation layer. Examples of the liquid crystal polymer used include nematic, smectic, cholesteric, and discotic liquid crystal polymers and mixtures thereof.

The circularly polarized light separation layer comprises a cholesteric liquid crystal polymer which has undergone Grandjean orientation, and functions to separate natural light into left and right, circularly polarized lights through reflection and transmission. The circularly polarized light separation layer can be formed using an appropriate cholesteric liquid crystal polymer and may comprise one or more layers of the cholesteric liquid crystal polymer. Cholesteric liquid crystal polymers are excellent in, for example, lamination efficiency of liquid crystal layers, thin film formation property, and ability to form a liquid crystal display having small change in optical properties with changing viewing angle and a wide viewing angle. Preferred among the cholesteric liquid crystal polymers are those having a large birefringence from the points of, for example, a wider wavelength region for selective reflection.

Examples of the cholesteric liquid crystal polymers include main-chain type or side-chain type cholesteric liquid crystal polymers in which conjugated linear atomic groups (mesogens) which impart the liquid crystalline orientation property have been incorporated in the main chain or side chains, respectively. Preferably used from the standpoints of handleability, orientation stability at practical temperatures, etc., are cholesteric liquid crystal polymers having a glass transition temperature of 30 to 150° C. Specific examples of the main-chain type cholesteric liquid crystal polymers include polymers having a structure in which mesogenic groups each comprising, e.g., a para-substituted cyclic compound have been bonded through, if necessary, a spacer part for imparting flexibility. Such polymers include polyesters, polyamides, polycarbonates, and polyesterimides.

Specific examples of the side-chain type cholesteric liquid crystal polymers include those comprising a backbone such as a polyacrylate, polymethacrylate, polysiloxane or polymalonate and having side chains each comprising a low molecular liquid crystal compound (mesogenic part) made up of, e.g., para-substituted cyclic compounds bonded through a spacer part comprising conjugated atomic groups; nematic liquid crystal polymers containing a low molecular chiral reagent; liquid crystal polymer containing an incorporated chiral component; and mixtures of nematic and cholesteric liquid crystal polymers.

As described above, polymers having para-substituted cyclic compounds which impart the nematic orientation property, comprising, for example, para-substituted aromatic or cyclohexyl ring units, such as azomethine, azo, azoxy, ester, biphenyl, phenylcyclohexane, or bicyclohexane compounds, may also be made to have the cholesteric orientation property by, for example, incorporating an appropriate chiral component or low molecular chirality each comprising, e.g., a compound having an asymmetric carbon atom (see, for example, JP-A-55-21479 (the term "JP-A" as used herein means an "unexamined published Japanese patent application") and U.S. Pat. No. 5,332,522). In the para-substituted cyclic compounds, each terminal substituent at the para position may be an appropriate group such as, e.g., a cyano, alkyl or alkoxy group.

Examples of the spacer part include flexible chains such as polymethylene chains $-(CH_2)_n-$ and polyoxymethylene chains $-(CH_2CH_2O)_m-$. The number of repetitions of the structural unit constituting the space part is appropriately determined by the chemical structure of the mesogenic parts, etc. In general, n in the polymethylene chains is 0 to 20, and preferably 2 to 12, and m in the polyoxymethylene chains is 0 to 10, and preferably 1 to 3.

The thickness of the liquid crystal polymer layer, in particular the cholesteric liquid crystal polymer layer, formed on an oriented film is generally 0.5 to 100 μm, preferably 1 to 50 μm, and more preferably 2 to 20 μm, from the standpoints of preventing uneven orientation or decrease in transmittance, selective reflection (wavelength range showing circular dichroism), etc.

The liquid crystal element formed may be formed as a lamination layer of two or more oriented layers 11, 12 of a liquid crystal polymer, as shown in FIG. 2. In the case of a circularly polarized light separation layer, the lamination of the cholesteric liquid crystal polymers is advantageous from the standpoints of widening the wavelength region for the separating function and of coping with the wavelength shift of oblique incident light, etc. In this case, it is preferred to laminate those in a combination that the laminated polymer layers have different central wavelength of reflected light.

The reason for the above is as follows. In the case of a single layer consisting of a cholesteric liquid crystal polymer, the wavelength region where selective reflection (circular dichroism) is shown is generally limited. Although in some cases the width of that wavelength region may be as large as about 100 nm, even this wavelength range does not cover the whole visible light region desired in applications such as liquid crystal displays. In such a case, the wavelength region where circular dichroism is shown can be widened by laminating layers of a cholesteric liquid crystal polymer, which differ from each other in selective reflection.

For example, a circularly polarized light separation layer can efficiently be formed by laminating two to six layers of a cholesteric liquid crystal polymer which have a central wavelength for selective reflection of 300 to 900 nm in such a manner that the layers used in combination reflect circularly polarized light of the same polarization direction and differ from each other in central wavelength for selective reflection. The above use of a combination of layers which reflect circularly polarized light of the same polarization direction is intended to enable the circularly polarized lights reflected respectively by the layers to have the same phase state and prevent the wavelength regions from differing in polarization state to thereby increase the amount of polarized light that can be utilized.

Although suitable cholesteric liquid crystal polymers may be used as described above, it is preferred to use liquid crystal polymers having a larger retardation because such liquid crystal polymers have a wider wavelength region for selective reflection and are hence advantageous from the standpoints of flexibility for decrease in the number of layers and for wavelength shifting as a result of a viewing angle increase, etc. From the standpoint of diminishing the dependence of color on viewing angle, it is preferred to laminate cholesteric liquid crystal polymers in the order of their increasing central wavelength for selective reflection and to dispose a ¼ wavelength plate on the longer wavelength side of the laminated layers.

The difference in central wavelength for selective reflection in cholesteric liquid crystal polymers is attributable to a difference in helical pitch as a result of Grandjean orientation. In the present invention, however, the circularly polarized light separation layer may have an appropriate constitution, e.g., a circularly polarized light separation layer in which the helical pitch changes in the thickness direction or a circularly polarized light separation layer in which two or more cholesteric liquid crystal polymer layers differing in helical pitch have been laminated in order of their central wavelength of reflected light so that the helical pitch changes in the thickness direction.

The above-described structures in which the helical pitch changes in the thickness direction are also effective, for example, in widening the wavelength region for selective reflection. Examples of such structures include a multilayer structure comprising two or more cholesteric liquid crystal polymer layers having the same helical pitch, such as a constitution comprising cholesteric liquid crystal polymer layers having the same helical pitch and one or more cholesteric liquid crystal polymer layers which each differs in helical pitch from those layers and which have been interposed between those layers in order of their central wavelength of reflected light.

The circularly polarized light separation layer in which the helical pitch changes in the thickness direction can be produced, for example, by preparing two or more layers of an oriented cholesteric liquid crystal polymer and bonding a given number of these layers by thermocompression bonding. For the thermocompression bonding, a suitable method can be used such as a method in which an appropriate heating/pressing means, e.g., a roll laminator, is used to heat cholesteric liquid crystal polymer layers to a temperature not lower than the glass transition temperature but below the isotropic phase transition temperature thereof and compression-bond these layers together.

In the case of solidified liquid crystal polymer layers united with a substrate, a circularly polarized light separation layer in which the helical pitch changes in the thickness direction can be obtained by laminating the solidified layers in the above-described manner so that these layers are in close contact with each other. For forming laminated liquid crystal polymer layers united with a substrate, there may be used, for example, a method in which the two or more layers are laminated through an adhesive layer according to need. A liquid crystal polymer film, e.g., a cholesteric liquid crystal polymer film, may be peeled from the oriented film and used as a liquid crystal polymer film; this film may be subjected to lamination treatment. Consequently, the liquid crystal element according to the present invention may consist only of one or more liquid crystal polymer layers, e.g., a liquid crystal polymer film, or may consist of one or more liquid crystal polymer layers laminated on and united with a substrate.

The circularly polarized light separation layer in which the helical pitch changes in the thickness direction may be one which shows a continuous wavelength region for reflected light or one which shows discontinuous wavelength regions for reflected light. These circularly polarized light separation layers can be produced by, for example, a method in which a multilayer structure comprising closely laminated cholesteric liquid crystal polymer layers formed by, e. g., the thermocompression bonding technique described above is heated to a temperature not lower than the glass transition temperature but below the isotropic phase transition temperature thereof to thereby form at each interface a layer in which the cholesteric liquid crystal polymers respectively constituting the upper and the lower layers have been mixed with each other in an oriented state.

The above cholesteric liquid crystal polymer layer comprising a mixture of the cholesteric liquid crystal polymers of the upper and the lower layers differs in helical pitch from each of the upper and lower layers to thereby form a circularly polarized light separation layer in which the helical pitch changes in multiple stages in the thickness direction. In general, the helical pitch thereof is intermediate between those of the cholesteric liquid crystal polymer layers respectively as the upper and lower layers, whereby the interfacial layer together with the upper and lower layers forms an area which shows a continuous wavelength region for reflected light.

Consequently, when a combination of upper and lower, cholesteric liquid crystal polymer layers whose wavelength regions for reflected light do not overlap with each other, i.e., a combination having wavelength regions for reflected light between which a missing region is present due to discontinuity, is used, the cholesteric liquid crystal polymer layer formed by the mixing of the upper and lower layers compensates for the missing region to thereby make the wavelength regions for reflected light continuous. Therefore, two cholesteric liquid crystal polymer layers which, for example, have reflection wavelength regions of 500 nm or less and 600 nm or more, respectively, can be used to obtain a circularly polarized light separation layer which also reflects light in the wavelength region of from 500 to 600 nm, which corresponds to the gap between the discontinued reflection wavelength regions. This means that a circularly polarized light separation layer having a wide reflection wavelength region can be formed with a smaller number of laminated cholesteric liquid crystal polymer layers.

Although the liquid crystal element of the present invention has been described above with respect to the use thereof as circularly polarized light separation layers, it can be advantageously used as various retardation plates, in particular those for use in compensating for the retardation caused by birefringence in liquid crystal cells. The liquid crystal element for use as such a retardation film may comprise an appropriate liquid crystal polymer. There are many cases where satisfactory compensation, e.g., coloring prevention, in a liquid crystal cell can be attained with a retardation film comprising a liquid crystal polymer of the same type as the liquid crystal contained in the liquid crystal cell, as in the case where a retardation film comprising a nematic liquid crystal polymer is used with a nematic liquid crystal cell.

The optical element according to the present invention comprises a multilayer structure comprising a liquid crystal element and a retardation film laminated thereon. The liquid crystal element and retardation film each may have a suitable constitution according to the intended use of the optical element. In this connection, an optical element which emits linearly polarized light can be obtained by laminating the circularly polarized light separation layer described above on a ¼ wavelength plate. An example of the optical element is shown in FIG. 3, wherein numeral 3 denotes a ¼ wavelength plate (retardation film).

Figure 3:
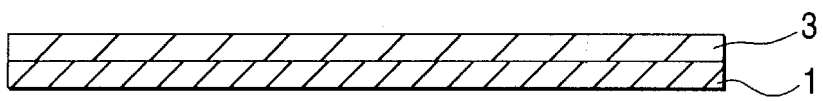
FIG. 3 is a sectional view showing an example of the optical element.

As shown in FIG. 3, the ¼ wavelength plate functions to convert the circularly polarized light which has passed through the circularly polarized light separation layer comprising the liquid crystal element 1 into linearly polarized light. In the present invention, the ¼ wavelength plate may comprise one or more retardation layers. From the standpoints of diminishing the dependence of color on viewing angle, etc., the ¼ wavelength plate is preferably disposed on that side of the circularly polarized light separation layer which has a longer central wavelength of reflected light.

For use in the visible light region, the ¼ wavelength plate (retardation film) is preferably one having a frontal retardation of 100 to 180 nm from the standpoints of the effect of forming linearly polarized light, compensation of the color change caused by oblique transmitted light, etc. Namely, it is preferred to use a ¼ wavelength plate which satisfies the equation $(n_x-n_y)d=\Delta nd=100$ to 180 nm, wherein $n_x$ is the maximum in-plane refractive index, $n_y$ is the refractive index in a direction perpendicular thereto, $n_z$ is the refractive index in the thickness direction, and d is the thickness.

If desired and necessary, a retardation layer may be used together with the above-described retardation layer functioning as a ¼ wavelength plate. This optional retardation layer is intended to be used for compensation. For example, the layer is intended to modify the light which has obliquely passed through the retardation layer functioning as a ¼ wavelength plate so that the light comes to have a color balance as close as possible to that of the vertically transmitted light to thereby enable the whole transmitted light to be seen, through a polarizing plate, as light having an intermediate color of a reduced color density. Specifically, a retardation layer having a frontal retardation ($\Delta$nd) of 100 to 720 nm is preferably used.

The retardation layer preferably used from the standpoints of color change compensation, etc. is one in which the thickness-direction refractive index is higher than at least one of the in-plane refractive indexes, or one in which $N_z$ represented by $(n_x-n_y)/(n_x-n_y)$ is 5 or smaller, preferably 2 or smaller, more preferably 1.1 or smaller (these values of $N_z$ may be minus numbers), wherein $n_x$ and $n_y$ each is an in-plane refractive index and $n_z$ is the thickness-direction refractive index.

The retardation layer may be made of any material. It is however preferred to use a material which has excellent transparency, in particular a light transmittance of 80% or higher, and gives a uniform retardation. In general, a stretched film made of any of the polymers enumerated hereinabove with regard to the oriented film and liquid crystal element described above or made of a liquid crystal polymer is used. Especially preferably used is a liquid crystal polymer of the twisted orientation type or the like.

In the case where refractive indexes including that in the thickness direction should be controlled in order to control properties such as $\Delta$nd and $N_z$, described above, this can be accomplished, for example, by bonding a polymer film to a heat-shrinkable film and stretching the polymer film with heating during the bonding operation. The thickness of the retardation layer, based on a single-layer constitution, is generally from 5 to 500 μm, preferably from 10 to 300 μm, and more preferably from 20 to 200 μm. However, the thickness thereof should not be construed as being limited thereto.

In the case where a retardation plate serving as, e.g., a ¼ wavelength plate is formed from a liquid crystal polymer, it can be obtained so as to have an appropriate constitution, e.g., as a film of an oriented liquid crystal polymer or as a layer of an oriented liquid crystal polymer supported on a substrate, as in the case of the circularly polarized light separation layer described above. In the case of using a liquid crystal polymer, the target retardation film can be obtained without stretching.

The ¼ wavelength plate may consist of only one retardation layer as described hereinabove, or may comprise a multilayer structure comprising two or more retardation layers which differ in retardation. The formation of a multilayer structure comprising retardation layers which differ in retardation is effective, for example, in widening the wavelength range in which the retardation plate functions as the desired ¼ wavelength plate or as a compensating plate, etc. In the case where a multilayer structure comprising laminated retardation layers is formed, it is preferred from the above standpoint to dispose therein at least one retardation layer in which the thickness-direction refractive index is higher than at least one of the in-plane refractive indexes.

Figure 4:
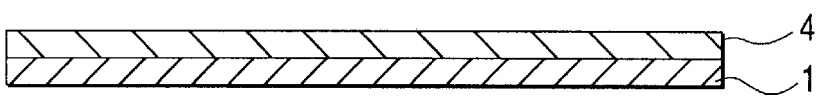
FIG. 4 is a sectional view showing one example of the polarizing element.
Figure 5:
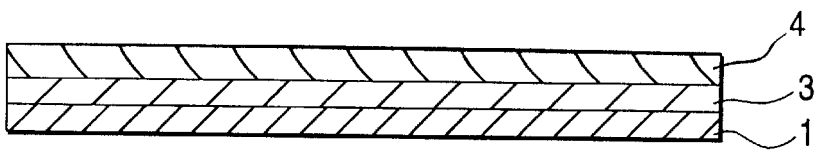
FIG. 5 is a sectional view showing another example of the polarizing element.

The polarizing element according to the present invention comprises a multilayer structure comprising the liquid crystal or optical element and a polarizing plate laminated thereon. Examples thereof are shown in FIGS. 4 and 5, wherein numeral 4 denotes a polarizing plate. In the case of an optical element comprising a circularly polarized light separation layer and a ¼ wavelength plate 3 laminated thereon, as shown in FIG. 5, a polarizing plate 4 is disposed on the ¼ wavelength plate side. This polarizing element as such can be applied to liquid crystal cells without using another polarizing plate.

A suitable polarizing plate can be used such as, e.g., an absorption type polarizing plate containing a dichroic substance or a polarizing plate comprising an oriented polyene film optionally having a transparent protective layer. Examples of the absorption type polarizing plate include a film obtained by adsorbing iodine or a dichroic substance, e.g., a dichroic dye, onto a hydrophilic polymer film, such as a poly(vinyl alcohol) film, a film of poly(vinyl alcohol) which has undergone partial conversion into formal, or a film of a partially saponified ethylene/vinyl acetate copolymer, and then stretching the film. Examples of the oriented polyene film include a film of dehydrated poly (vinyl alcohol) and a film of dehydrochlorinated poly(vinyl chloride). Although the polarizing plate usually has a thickness of from 5 to 80 $\mu$m, its thickness should not be construed as being limited thereto.

For fabricating a liquid crystal display, a polarizing plate having a high degree of polarization is preferably used such as an absorption type polarizing plate containing a dichroic substance, from the standpoints of, e.g., attaining bright display, i.e., obtaining display having a satisfactory contrast by allowing the light which has been highly linearly polarized with a ¼ wavelength plate to pass through the polarizing film while minimizing the absorption loss and thus causing the highly linearly polarized light to enter a liquid crystal cell. Especially preferred among such polarizing plates are absorption type polarizing films containing a dichroic substance and having a light transmittance of 40% or higher and a degree of polarization of 95.0% or higher, and preferably 99% or higher.

The transparent protective layer is a layer formed for protection especially in the case of a polarizing plate having poor water resistance like the polarizing plate containing a dichroic substance. The protective layer may be formed by an appropriate method such as plastic coating or film laminating. In the case where the protective layer is formed using a separately prepared film or the like, it is preferred to obtain a united structure through laminating with an adhesive layer from the standpoints of reflection loss prevention, etc. Although the transparent protective layer may have an appropriate thickness, the thickness thereof is generally 1 mm or smaller, preferably 500 $\mu$m or smaller, and more preferably from 1 to 300 $\mu$m. The plastic may be an appropriate one, examples of which include those enumerated hereinabove with regard to the oriented film, etc.

The transparent resin layer may be formed so as to have a finely roughened surface structure by, for example, incorporating fine particles thereinto. The fine particles are ones which have an average particle diameter of, e.g., from 0.5 to 5 $\mu$m and are transparent in the transparent resin layer. Examples thereof include inorganic fine particles which may be electroconductive such as silica, alumina, titania, zirconia, tin oxide, indium oxide, cadmium oxide, and antimony oxide and organic fine particles such as particles of crosslinked or uncrosslinked polymers. In general, the content of such fine particles is from 2 to 25% by weight, and preferably from 5 to 20% by weight.

When a polarizing plate is disposed on the upper side of a ¼ wavelength plate, the disposition angle of the polarizing plate with respect to the ¼ wavelength plate can be suitably determined according to the retardation characteristics of the ¼ wavelength plate, the properties of the circularly polarized light entering the same, etc. However, from the standpoints of improving the efficiency of light utilization, etc., the polarizing plate is preferably disposed so that the transmission axis of the polarizing plate becomes as parallel as possible to the direction of polarization (oscillation) of the light which has been linearly polarized with the ¼ wavelength plate.

Figure 6:
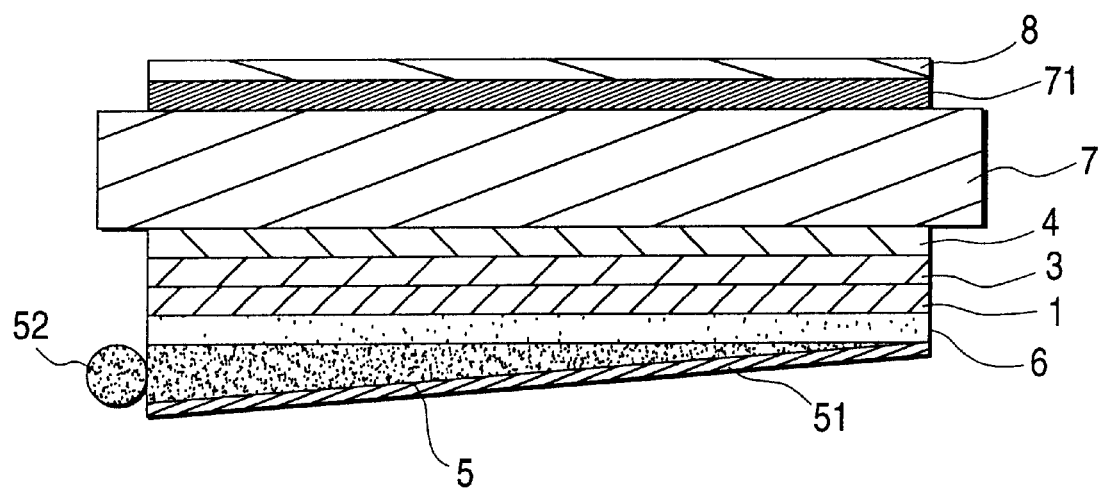
FIG. 6 is a sectional view showing an example of a liquid crystal display.

In the polarizing element shown as an example in FIG. 5, natural light or light from a light source is separated into left-hand and right-hand, circularly polarized lights through reflection and transmission by means of the circularly polarized light separation layer, and the circularly polarized lights and elliptically polarized light which have passed through the circularly polarized light separation layer are converted with the ¼ wavelength plate into linearly polarized light, which is fed to the polarizing film. Consequently, when this polarizing element is disposed on an appropriate surface light source 5, e.g., a side light type light guide plate or an EL lamp, it is possible to fabricate an illuminator suitable for use as, e.g., the back light of a liquid crystal display, as shown in FIG. 6. The surface light source shown in the figure comprises a light guide plate 5 having a reflecting layer 51 on the back surface thereof and a light source 52 disposed at the side of the plate 5.

In the illuminator shown in FIG. 6, the light from the light source 52 strikes on the corresponding side of the light guide plate 5 and is subsequently reflected by the back surface of the light guide plate 5, etc. and then emitted from the front surface of the light guide plate. The emitted light passes through the circularly polarized light separation layer 1 disposed on the front side of the light guide plate to thereby become desirable circularly polarized lights (vertical) and elliptically polarized light (oblique). These lights are converted to linearly polarized light with the ¼ wavelength plate 3 and then enter the polarizing film 4.

On the other hand, the light which has been reflected as undesirable circularly polarized light by the circularly polarized light separation layer 1 reenters the light guide plate 5, is reflected by the reflecting layer 51 disposed on the back surface of the plate 5, and reenters as return light into the circularly polarized light separation layer 1. Part of the return light passes through the circularly polarized light separation layer. Consequently, the light reflected by the circularly polarized separation layer is confined between the circularly polarized separation layer and the light guide plate and repeatedly reflected therebetween until it passes through the circularly polarized separation layer.

As described above, the reflected light returned to the side light type light guide plate is confined between the circularly polarized separation layer and the reflecting layer of the light guide plate and repeatedly reflected therebetween, during which the light gradually passes through the circularly polarized separation layer. Namely, the light which thus passes through the separation layer is emitted together with the initially transmitted part of the incident light from the light source. Thus, the amount of unutilized light attributable to reflection loss is reduced.

On the other hand, the light emitted from the separation layer for circular light polarization is converted with the ¼ wavelength plate into linearly polarized light or into elliptically polarized light having a large proportion of linearly polarized light components. This converted light is hardly absorbed by the polarizing plate and passes therethrough, when the direction of the linear polarization thereof coincides with the transmission axis of the polarizing plate. Thus, the amount of unutilized light attributable to absorption loss is also reduced. As a result, the light which has conventionally been unutilized due to reflection and absorption losses can be effectively utilized and the efficiency of light utilization can be improved. Consequently, a side light type light guide plate is preferred as the surface light source.

The light guide plate may be an appropriate one which has such a constitution that light is emitted from its front side via the back surface, etc. Preferably used is a light guide plate which is capable of efficiently emitting light without absorption. An example thereof is the known side light type back light for use in liquid crystal displays which comprises a light guide plate 5 and, disposed at the side thereof, a light source such as a linear light source, e.g., a (cold or hot) cathode tube, a light-emitting diode, or an EL, and has such a constitution that the light transmitted by the light guide plate is emitted from one side of the plate through diffusion, reflection, diffraction, interference, etc.

In fabricating the illuminator described above, a suitable combination of the light guide plate 5 with one or more auxiliary means disposed in predetermined positions, e.g., on the upper or lower surface of the light guide plate 5 or at the side thereof, is formed as shown in FIG. 6. Examples of such auxiliary means include a prism array layer 6 which comprises a prism sheet, etc. and is used for controlling the direction of light emission, a diffusing plate for obtaining uniform illumination, and a light source holder for introducing the light emitted by the linear light source into the side of the light guide plate.

In the present invention, the layers constituting the optical element, polarizing element, or illuminator described above, e.g., a liquid crystal element (separation layer for circular light polarization), a retardation plate (¼ wavelength plate), a polarizing plate, and a light guide plate, can be united by laminating with each other through an adhesive if desired and necessary. This laminating and uniting of constituent layers is effective, for example, in inhibiting reflection loss at each interface and preventing foreign matters, etc. from coming into each interface to thereby avoid a decrease in, e.g., display quality, and in preventing the compensation efficiency, the efficiency of polarized light conversion, etc. from decreasing due to the position shifting of members of the optical system. Consequently, also in the case where the liquid crystal element, retardation film, polarizing plate, light guide plate, or the like is constituted of two or more layers, it is preferred to tightly unite these layers with each other through an adhesive layer, etc. A suitable adhesive may be used for this purpose, such as, e.g., a pressure-sensitive adhesive.

In each of the optical element, polarizing element, and illuminator according to the present invention, an appropriate optical layer such as, e.g., a light-diffusing plate may be disposed in an appropriate position, e.g., on a surface thereof or between layers. The device shown in FIG. 6 is an example of a liquid crystal display, which contains a liquid crystal cell 7 disposed through an optical element on the light emission side of the light guide plate 5 as a component of the illuminator. As shown in the figure, the liquid crystal cell is disposed on that side of the optical element on which the ¼ wavelength plate 3 is present. In FIG. 6, numeral 71 denotes a polarizing plate and 8 a light-diffusing plate for diffusing the light to be viewed.

A liquid crystal display is generally fabricated by, for example, suitably assembling components including a polarizing plate, a liquid crystal cell, and a back light and a retardation film for compensation as an optional component and integrating a driving circuit into the assembly. In the present invention, the liquid crystal display can be fabricated according to a conventional method without particular limitations, except that as described above the optical element, polarizing element, or illuminator is disposed on that side of the liquid crystal cell which is opposite to the side from which the liquid crystal display is viewed, through a ¼ wavelength plate or polarizing plate. It is however preferred that the components have been bonded and united with each other through a pressure-sensitive adhesive.

In fabricating the liquid crystal display, appropriate optical layers can be suitably disposed. For example, a light-diffusing plate, anti-glare layer, antireflection film, protective layer, or protective plate may be disposed over the polarizing plate disposed on the side from which the liquid crystal display is viewed. Furthermore, a retardation film for compensation may be interposed, for example, between the liquid crystal cell and the polarizing plate disposed on the side from which the liquid crystal display is viewed.

The retardation film for compensation is intended, for example, to compensate for the wavelength dependence of birefringence, etc. to thereby improve visual perceptibility, as described above. In the present invention, this retardation film is disposed, for example, between the liquid crystal cell and at least one of the polarizing plates disposed respectively on the side from which the liquid crystal display is viewed and on the back light side, according to need. As the above retardation film for compensation, a suitable retardation film can be used according to wavelength region, etc. For example, a liquid crystal element according to the present invention or the retardation plate described above may be used. The retardation film for compensation may comprise two or more retardation layers.

The present invention will be explained below in more detail by reference to the following Examples, but the invention should not be construed as being limited thereto.

EXAMPLE 1

A poly(vinyl alcohol) layer having a thickness of 0.1 μm was formed on a cellulose triacetate film having a thickness of 50 μm, and the poly(vinyl alcohol) layer was rubbed with a rayon cloth. A 20 wt % tetrachloroethane solution of a thermotropic, nematic, liquid crystal acrylic polymer was applied on the rubbed layer with a wire-wound bar, and the liquid crystal polymer was oriented by heating at 160±2° C. for 5 minutes. The resulting structure was cool to room temperature. Thus, a liquid crystal element (retardation plate for compensation) having a nematic liquid crystal layer with a thickness of 1.5 μm was obtained.

EXAMPLE 2

The same procedure as in Example 1 was conducted, except that a 20 wt % tetrahydrofuran solution of a thermotropic, cholesteric, liquid crystal acrylic polymer was used in place of the 20 w % tetrachloroethane solution of a thermotropic, nematic, liquid crystal acrylic polymer. Thus, a liquid crystal element having a cholesteric liquid crystal polymer layer with a thickness of 2 μm was obtained. This liquid crystal element functioned as a circularly polarized separation which showed selective reflection in the wavelength range of from 500 to 600 nm.

EXAMPLE 3

A liquid crystal element was obtained in the same manner as in Example 2, except that the orientation with heating was conducted at 160±100° C.

COMPARATIVE EXAMPLE

A liquid crystal element was obtained in the same manner as in Example 1, except that the orientation with heating was conducted at 160±100° C.

EVALUATION TESTS

Average haze and dispersion

The turbidity of the liquid crystal polymer layer in each of the liquid crystal elements obtained in the Examples and Comparative Example was measured from the front side. From the found values of turbidity, the average in-plane haze and the dispersion of haze for sites based on the average value were determined.

Display unevenness

Each of the liquid crystal elements obtained in Example 1 and Comparative Example was disposed as a retardation film for compensation on one side of an STN liquid crystal cell free from front-direction display unevenness. The resulting assembly each was disposed on a surface light source free from brightness unevenness, and then examined with a color meter for display unevenness in a slant viewing direction forming an angle of 45° with the front direction.

On the other hand, a retardation film (¼ wavelength plate) having a retardation of 135 nm was bonded with an acrylic pressure-sensitive adhesive layer to one side of each of the liquid crystal elements obtained in Examples 2 and 3 to thereby fabricate optical elements (circularly polarized light separation layers for linear light polarization). Each of the resulting optical elements was disposed on one side of a TFT liquid crystal cell having a polarizing plate on each side and free from front-direction display unevenness, in such a manner that the retardation film faced the cell. The resulting assemblies each was disposed on a surface light source free from brightness unevenness, and then examined with a color meter for display unevenness in a slant viewing direction forming an angle of 45° with the front direction. The above disposition was conducted in such a manner that the optical element was located between the liquid crystal cell and the surface light source, and that the disposition angle of the optical element was regulated so that the liquid crystal cell showed the maximum brightness.

The results of the above evaluations are shown in the following table.

|  | Average haze (dispersion) | Display unevenness |
|---|---|---|
| Example 1 | 1.0% (±0.5%) | almost no unevenness |
| Example 2 | 6.0% (±3.0%) | almost no unevenness |
| Example 3 | 12.0% (±11.0%) | slight unevenness |
| Comparative Example | 2.0% (+6.0%, −2.0%) | considerable unevenness |

EXAMPLE 4

An optical element employing the liquid crystal element obtained in Example 3 was used to fabricate a display according to the same method as for the display unevenness evaluation described above, except that a liquid crystal cell for use in large monitors which was free from front-direction display unevenness was used in place of the TFT liquid crystal cell. The display fabricated was visually examined from various directions for display unevenness. As a result, no display unevenness impairing visual perceptibility was observed in contrast to the case of the TFT liquid crystal cell.

The liquid-crystal elements obtained in the Examples and Comparative Example were examined with a microscope, etc. for orientation (the proportion of oriented molecules) and orientation unevenness (dispersion of the directions of oriented molecules). As a result, the liquid crystal elements obtained in Examples 1 and 2 were excellent in orientation and evenness of orientation direction, whereas the liquid crystal element obtained in Comparative Example had poor orientation and considerable unevenness of orientation. On the other hand, the liquid crystal element obtained in Example 3 was superior to that obtained in Comparative Example in orientation and evenness of orientation direction, although inferior in these properties to the liquid crystal elements obtained in Examples 1 and 2.

While the invention has been described in detail and with reference to specific embodiments thereof, it will be apparent to one skilled in the art that various changes and modifications can be made therein without departing from the spirit and scope thereof.

What is claimed is:

1. A liquid crystal element which comprises either a layer of an oriented liquid crystal polymer, or a substrate and formed thereon the layer of an oriented liquid crystal polymer, said liquid crystal polymer layer having an average in-plane haze of 10% or higher and having a dispersion of the in-plane haze H (%) within the range represented by the relationship $a-\sqrt{10a} \leq H \leq a+\sqrt{10a}$ wherein "a" is the average haze (%).

2. The liquid crystal element of claim 1, wherein the liquid crystal polymer is a cholesteric liquid crystal polymer.

3. The liquid crystal element of claim 2, which is used in compensating for a retardation caused by a liquid crystal cell.

4. An optical element comprising a multilayer structure comprising the liquid crystal element of claim 2 and a retardation film laminated thereon.

5. A polarizing element comprising a multilayer structure comprising the liquid crystal element of claim 2 and a polarizing plate laminated on the liquid crystal element.

6. The liquid crystal element of claim 1, which is used in compensating for a retardation caused by a liquid crystal cell.

7. An optical element comprising a multilayer structure comprising the liquid crystal element of claim 6 and a retardation film laminated thereon.

8. A polarizing element comprising a multilayer structure comprising the liquid crystal element of claim 6 and a polarizing plate laminated on the liquid crystal element.

9. An optical element comprising a multilayer structure comprising the liquid crystal element of claim 1, and a retardation film laminated thereon.

10. A polarizing element comprising a multilayer structure comprising the optical element of claim 9 and a polarizing plate laminated on the optical element.

11. A polarizing element comprising a multilayer structure comprising the liquid crystal element of claim 1 and a polarizing plate laminated on the liquid crystal element.

* * * * *